United States Patent [19]
Jubin, Jr.

[11] Patent Number: 5,552,131
[45] Date of Patent: Sep. 3, 1996

[54] OXIDATION OF SECONDARY ALCOHOLS

[75] Inventor: John C. Jubin, Jr., West Chester, Pa.

[73] Assignee: ARCO Chemical Technology, L.P., Greenville, Del.

[21] Appl. No.: 268,891

[22] Filed: Jun. 30, 1994

[51] Int. Cl.⁶ .................................. C01B 15/01
[52] U.S. Cl. ................... 423/584; 423/582; 423/588; 568/577
[58] Field of Search ................... 423/582, 584, 423/588; 568/577

[56] References Cited

U.S. PATENT DOCUMENTS

| | | | |
|---|---|---|---|
| 2,871,101 | 1/1959 | Rust et al. | 423/591 |
| 2,871,102 | 1/1959 | Rust et al. | 423/591 |
| 2,871,103 | 1/1959 | Skinner et al. | 423/591 |
| 2,871,104 | 1/1959 | Rust | 423/591 |
| 3,003,853 | 8/1961 | Mecorney et al. | 423/591 |

FOREIGN PATENT DOCUMENTS 1421449  5/1973  United Kingdom.

*Primary Examiner*—Werren B. Lone
*Attorney, Agent, or Firm*—William C. Long

[57] ABSTRACT

A process and apparatus for the molecular oxygen oxidation of a secondary alcohol such as isopropanol to hydrogen peroxide is provided.

5 Claims, 3 Drawing Sheets

5,552,131

OXIDATION OF SECONDARY ALCOHOLS

BACKGROUND OF THE INVENTION

1. Field of the Invention

The present invention relates to the oxidation of a secondary alcohol such as isopropanol to form hydrogen peroxide and to an improved method and apparatus for carrying out this oxidation.

2. Description of the Prior Art

Methods are known for the production of hydrogen peroxide by the molecular oxygen oxidation of a secondary alcohol at conditions of elevated temperature and pressure. See, for example, U.S. Pat. No. 2,871,101 to Rust, et al., U.S. Pat. No. 2,871,102 to Rust, et al., U.S. Pat. No. 2,871,103 to Skinner, et al., U.S. Pat. No. 2,871,104 to Rust, and the like.

There are problems associated with the secondary alcohol oxidation. The reaction is exothermic and involves mixing and handling potentially flammable materials. Selectivity to the desired hydrogen peroxide product has been lower than desired. A consideration in the oxidation of lower secondary alcohols to form hydrogen peroxide is that the partial pressure of oxygen in the vapor above the liquid reaction mixture must be relatively high in order to achieve good reaction selectivities. This requirement precludes simple purging or venting or effluent gases after separation of condensibles and also poses considerable flammability problems in handling effluent gases from the reactor. The present invention provides a process and apparatus for carrying out the reaction at high selectivity while minimizing problems associated with the reaction system.

BRIEF DESCRIPTION OF THE INVENTION

In one aspect, the invention relates to an improved method for providing oxygen to the reaction system. Rather than sparging oxygen into the reactor as has been suggested by prior workers, in accordance with the invention oxygen is added to a circulating reaction mixture stream which is circulated at high velocity and the resulting liquid reaction mixture and dispersed oxygen is passed to the reactor thereby providing a high rate of mixing and dispersion.

In another aspect, an improved process and a unique reactor design is provided by which the secondary alcohol oxidation is carried out in a plurality of distinct reaction zones.

In yet another aspect, a ballast gas is incorporated in reactor off-gases to facilitate treatment.

DESCRIPTION OF THE DRAWINGS

Accompanying

DETAILED DESCRIPTION

The general conditions for carrying out the secondary alcohol oxidation are those described, for example, in U.S. Pat. No. 2,871,104, the disclosure of which is hereby incorporated by reference. This reference describes reactants and reaction conditions used in the process of the present invention.

Figure 1:
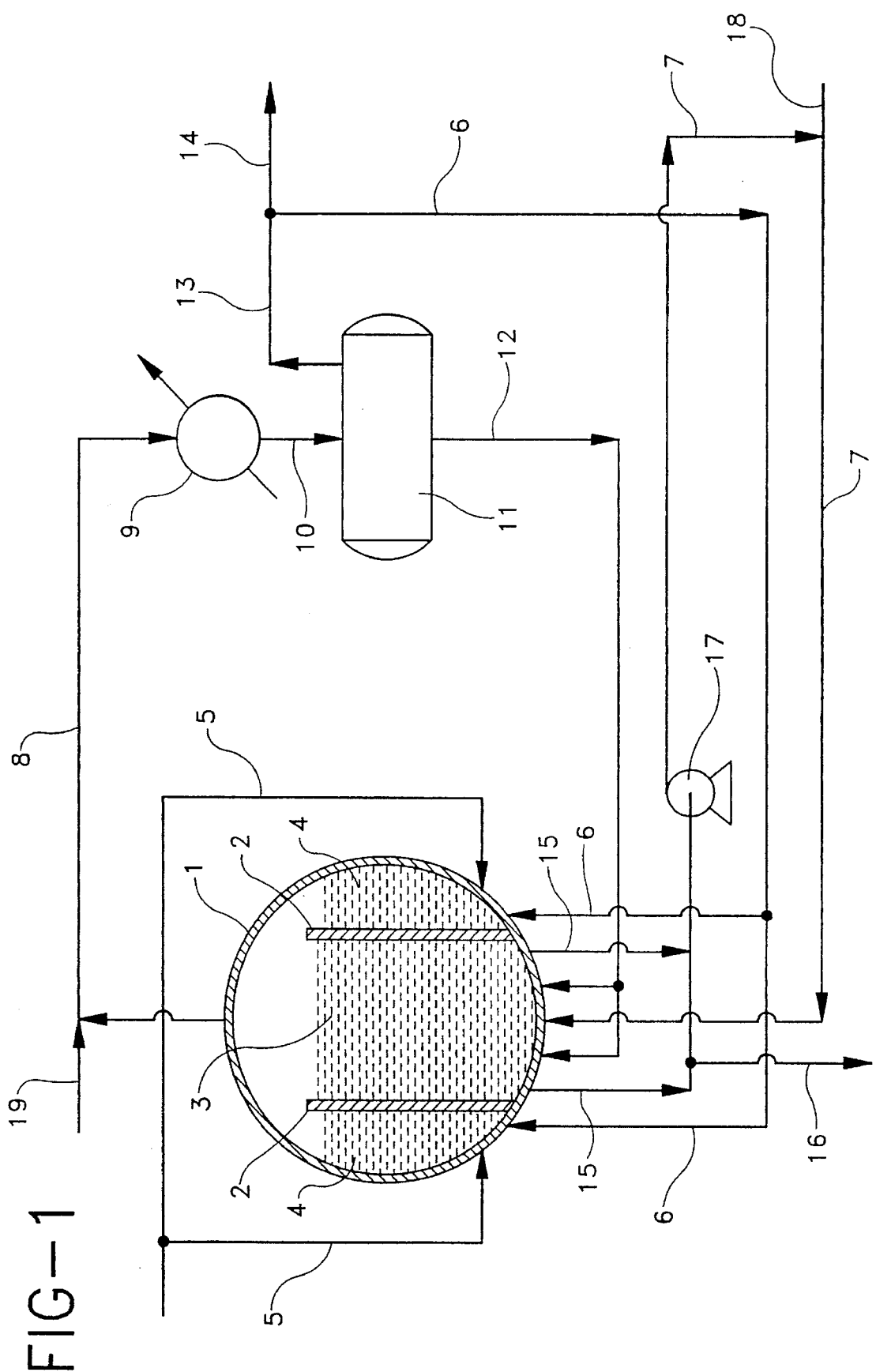
FIG. 1 illustrates schematically practice of the invention including the oxygen introduction procedure.

Attached FIG. 1 illustrates the oxygen addition procedure of the present invention. Referring to FIG. 1, the liquid phase oxidation of the secondary alcohol is carried out in reaction vessel 1. In the oxidation, it is advantageous to employ a reactor having a low surface area to volume ratio in order to minimize reactor surface caused hydrogen peroxide decomposition and for this reason the spherical reactor configuration shown in FIG. 1 is preferred. The cost of a spherical reactor is also less than one half the cost of a cylindrical reactor. Cylindrical and other shaped reactors can be employed but are less preferable.

As shown in FIG. 1 and described more fully hereinbelow, spherical reactor 1 is provided with cylindrical baffle 2 which divides reactor 1 into a central cylindrical zone 3 and an annular zone 4. Holes are provided in the lower section of baffle 2 effective to permit circulation of reaction liquid from zone 4 to zone 3.

Feed secondary alcohol such as isopropanol is introduced via lines 5 into annular zone 4. The temperature in zone 4 is effectively controlled by regulating the temperature of the feed alcohol. Oxygen for the oxidation is supplied to zone 4 as part of the recycle gas stream introduced to zone 4 via lines 6. Conditions are controlled such that about 10–30% of the total alcohol oxidation to hydrogen peroxide takes place in zone 4. It is generally preferred to carry out the oxidation such that the per pass alcohol conversion is less than 50%, preferably 10–40% in the overall oxidizer.

Selectivity to the desired hydrogen peroxide product is favored by low concentrations of hydrogen peroxide in the reaction mixture. It is advantageous to maintain the hydrogen peroxide concentration in the reaction mixture in annular zone 4 at about 1–10 wt %, preferably 2–8 wt %, and the concentration of hydrogen peroxide in the reaction mixture in zone 3 at about 10–40 wt %, preferably 15–30 wt %.

The liquid reaction mixture from zone 4 flows through the holes in the lower part of baffle 2 into central cylindrical zone 3 where the bulk of the alcohol oxidation eg. 70–90%, takes place. Oxygen is introduced into zone 3 via line 7 along with recycle reaction liquid as later described. Temperature is controlled and the reaction exothermic heat removed by vaporizing part of the reaction mixture, removing the vapor via line 8, and condensing the condensible portion in condenser 9. Vapors from both zones 3 and 4 exit reactor 1 via outlet 8. The cooled mixture passes from condenser 9 via line 10 to separator 11 and condensed liquid passes from separator 11 via line 12 back to zone 3 of the reactor. Uncondensed vapors are removed from separator 11 via line 13, a portion is purged via line 14 and remainder is passed via line 6 to zone 4 of the reactor.

As a special feature of the invention, the molecular oxygen oxidant is introduced in a manner which substantially lessens flammability problems normally encountered in such systems. Specifically, liquid reaction mixture is withdrawn at an extremely high rate from zone 3 via lines 15. A net product stream comprising about 5 to 25% of the reaction mixture withdrawn via lines 15 is removed via line 16 with the remainder circulating via pump 17 and line 7 back to zone 3 of the reactor. Thus for each volume of product withdrawn, 3–19 volumes of reaction liquid are recirculated to zone 3.

The total oxygen feed required for both zones 3 and 4 is introduced into the circulating reaction mixture via line 18 whereby due to the rapid liquid circulation rate in line 7, the introduced oxygen is almost immediately dispersed in the liquid without the formation of possibly flammable vapor pockets. The high rate of circulation via line 7 also ensures good mixing in zone 3 thus promoting the speed and uniformity of the reaction therein.

In certain technologies, exothermic heat of reaction is removed by indirect heat exchange with circulating reaction liquid. In the present system, this method of heat removal with its disadvantageous effect of hydrogen peroxide decomposition by contact with metal heat transfer surfaces can be avoided.

A further feature of the invention is the provision of a ballast gas such as methane which has a high heat capacity and which is substantially inert under the reaction conditions to suppress the flammability characteristics of the vapor removed from separator 3. The ballast gas is introduced via line 19 and admixed with the reaction vapor mixture in line 8. Although methane is preferred, other ballast gases which can be used include ethane and propane.

In the oxidation of secondary alcohol to hydrogen peroxide, in order to achieve good reaction rate and selectivity it is necessary to operate under conditions such that there is a substantial partial pressure of oxygen in the exit gas. The presence of a ballast gas such as methane in the exit gas during subsequent treatment steps and recycle is useful in avoiding possible flammability problems. Generally, the ballast gas is added in amount sufficient to provide a ballast gas concentration in the recycle gas of about 5–40 volume %.

The oxygen introduction system and the use of ballast gas have been described in conjunction with the novel plural zone reactor depicted in FIG. 1 but is will be understood that these features are useful generally in secondary alcohol oxidation to hydrogen peroxide and can be used with other known reactor configurations.

Figure 2A:
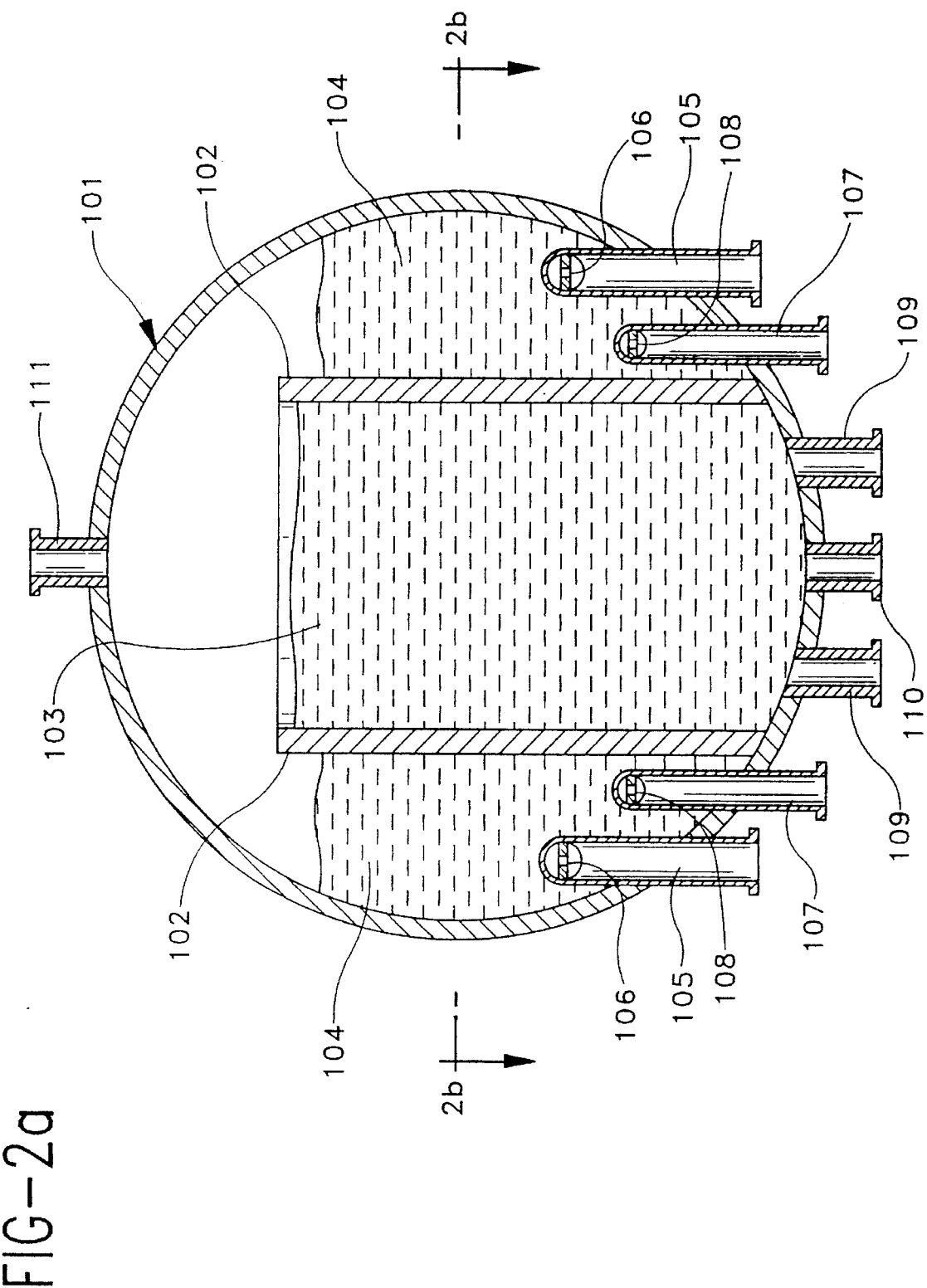
FIGS. 2a and 2b illustrate the plural zone reaction system of the invention.
Figure 2B:
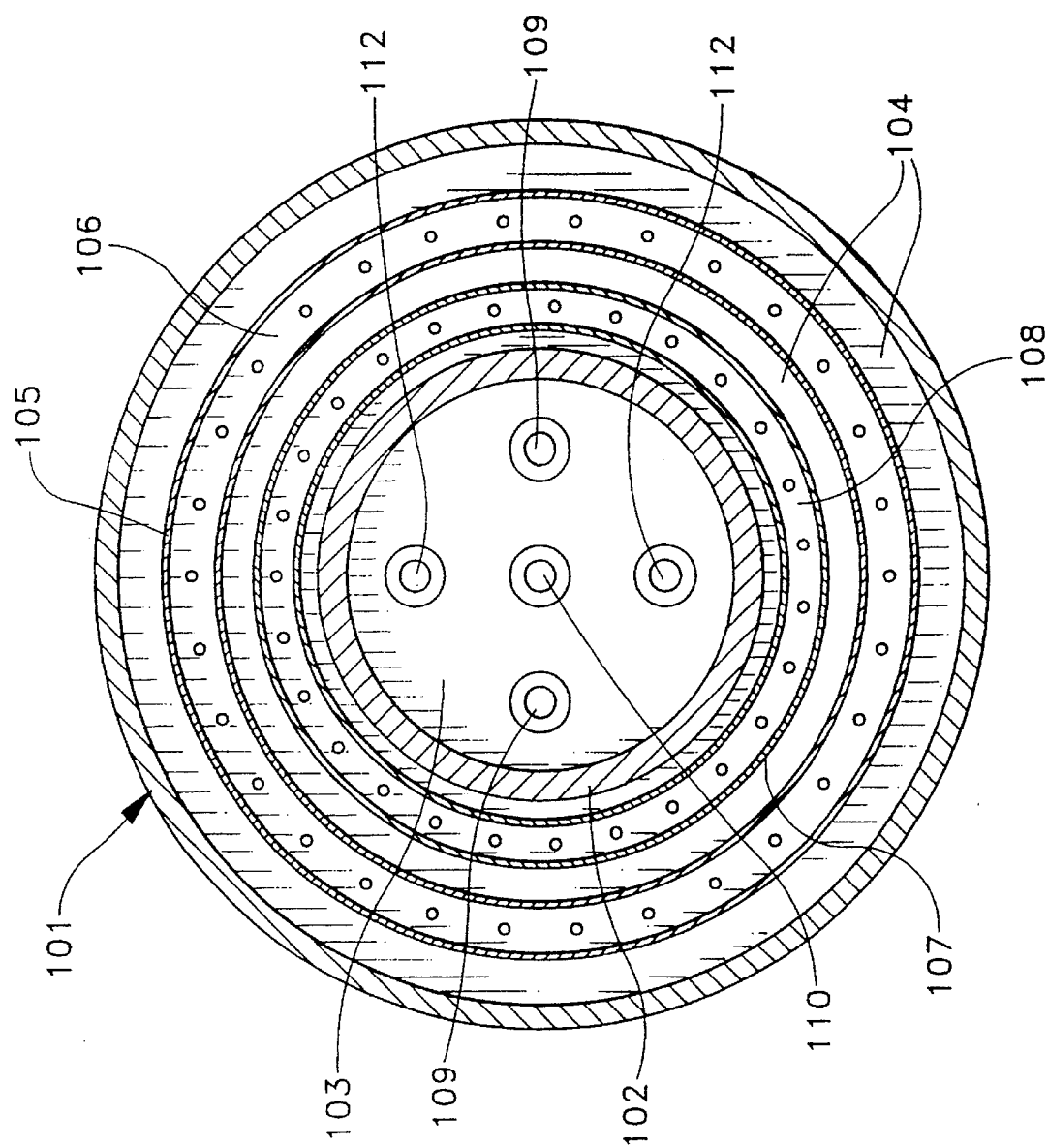

A special feature of the present invention is the provision of a novel reactor and process as illustrated in FIGS. 2a and 2b. FIG. 2a is an elevation view of the reactor while FIG. 2b is a sectional view A—A of the reactor. Referring to FIGS. 2a and 2b, reactor 101 is a spherical reactor having cylindrical baffle 102 mounted therein so as to provide a central cylindrical reaction zone 103 and an annular reaction zone 104 separated by the baffle. The bottom of the baffle 102 is secured to the inner wall of reactor 101. A common vapor space is above zones 103 and 104.

Baffle 102 has holes near its lower end adapted for the passage of the reaction mixture therethrough from annular zone 104 to central cylindrical zone 103. Reactor 101 is adapted for the continuous oxidation of a secondary alcohol to form hydrogen peroxide. Secondary alcohol is fed to zone 104 of reactor 101 via inlets 105 and distributed via distributor 106. The oxygen containing recycle gas stream is fed to zone 104 via inlet 107 and distributed via distributor 108. Reaction temperature in zone 104 is regulated by adjustment of the temperature of the feed secondary alcohol. Conditions in zone 104 are controlled to provide about 10–30% of the total conversion of the secondary alcohol.

During operation, reaction mixture from zone 104 continuously flows through the holes in baffle 102 into zone 103. Liquid reaction mixture is removed from zone 103 via outlets 109 with a portion recovered as product and the predominance being recirculated after oxygen injection as above described, the mixture of recirculated liquid and feed oxygen entering zone 103 via inlet 110.

The predominance of the secondary alcohol oxidation takes place in zone 103, good mixing being provided by the high rate of liquid circulation. The exothermic heat of reaction is removed by vaporization of a portion of the reaction mixture, removal of the vapor mixture via outlet 111 and condensation of components of the removed vapor. As described with respect to FIG. 1, the mixture from the condensation is separated, liquid is recycled to zone 103 via inlets 112 the circulated reaction liquid and feed oxygen are passed to zone 103 via inlets 110 while the oxygen containing vapor after separation of a purge stream is returned to zone 104 via inlets 107.

The liquid level in cylindrical zone 103 tends to be higher than the level in annular zone 104 since zone 103 is essentially operated as a boiling reactor and appropriate level control means (not shown) should be provided to prevent overflow from zone 103 to zone 104.

It is important that a substantial oxygen partial pressure, e.g. 10 psi or more, be maintained in the vapor stream exiting the reactor via outlet 11 in order that high reaction rate and selectivity be achieved.

The reaction mixture in annular zone 104 is maintained at a lower temperature than the temperature of the mixture in zone 103, usually 3°–5° C. lower. In this way, excessive vaporization from this zone is prevented. The reaction taking place in annular zone 104 is more selective, due to the lower peroxide concentration.

The following example illustrates practice of the invention.

EXAMPLE

In accordance with FIGS. 1, 2a and 2b, a spherical reactor 34 ft. in diameter is provided having a cylindrical baffle, 20 ft. in diameter, mounted therein secured at the bottom to the inner reactor wall as indicated in FIG. 2. Baffle height is 26 ft. and 21 holes having a diameter of 2 inches are evenly spaced at the baffle bottom.

Referring to FIG. 1, feed isopropanol passes via lines 5 into reaction zone 4 and recycle vapor from separator 11 passes via lines 6 to zone 4. The temperature of the reaction mixture in zone 4 is maintained at 145° C. by virtue of the feed isopropanol being introduced at a temperature of 120° C. The average residence time of the reaction mixture in zone 4 is about 50 minutes and about 5% of the isopropanol feed to zone 4 is oxidized therein.

Reaction mixture flows from zone 4 to zone 3 via the holes at the bottom of baffle 2 as above described. Also fed to zone 3 is the liquid condensate from separator 11 which passes to zone 3 via line 12. A stream of liquid reaction mixture is continuously removed from zone 3 via lines 15, a net liquid product stream being separated via line 16 with the remainder of the liquid reaction mixture circulating via pump 17 and line 7 back to zone 3.

Oxygen feed to the reaction system is provided via line 18. In accordance with the invention, the oxygen is sparged into the high velocity circulating liquid reaction mixture wherein it is rapidly dispersed without the formation of possibly hazardous vapor pockets, and passes to zone 3 along with the circulating liquid in line 7.

Good mixing is achieved in zone 3 by virtue of the introduction therein of the oxygen and recycle liquid. Temperature in zone 3 is 150° C. and the average residence time therein is 50 minutes.

Vapors are continuously withdrawn from reactor 1 via line 8 at a rate effective to maintain the desired temperatures in zone 3. The reactor pressure is 150 psia and the oxygen partial pressure in the vapors exiting via line 8 is 9 psi.

Methane ballast vapor is introduced via line 19 into the reaction vapor in line 8, and the resulting mixture passes to condenser 9 wherein it is cooled to 120° C. and thence to liquid/vapor separator 11. Uncondensed vapors are separated via line 13 with a purge stream taken via line 14 and the remaining vapor (after a recompression which is not shown) is recycled via lines 6 to zone 4 of reaction 1. Liquid condensate from separator 11 recycles via line 12 to zone 3 of reactor 1.

The following table shows the compositions and flow rates of the various process streams.

TABLE

|  | Stream | | | | |
| --- | --- | --- | --- | --- | --- |
|  | 5 | 6 | 15 | 16 | 7 |
| Flow rate, lbs/hr | 525 | 50 | 3700 | 563 | 3132 |
| Temp., °F. | 200 | 278 | 300 | 300 | 300 |
| Pressure, psia | 165 | 170 | 160 | 160 | 170 |
|  | Composition, wt % | | | | |
| IPA | 87 | 35.4 | 63 | 63 | 63 |
| $O_2$ | — | 22.5 | — | — | — |
| Acetone | 1 | 26.9 | 16.8 | 16.8 | 16.8 |
| $H_2O_2$ | — | — | 7.7 | 7.7 | 7.7 |
| Methane | — | 9 | — | — | — |
| $H_2O$ | 12 | 5.6 | 11.7 | 11.7 | 11.7 |
|  | Stream | | | | |
|  | 18 | 8 | 19 | 14 | 12 |
| Flow rate, lbs/hr | 100 | 221 | 1 | 7 | 180 |
| Temp., °F. | 100 | 300 | 100 | 250 | 250 |
| Pressure, psia | 175 | 150 | 150 | 150 | 150 |
|  | Composition, wt % | | | | |
| IPA | — | 58 | — | 35.4 | 62.9 |
| $O_2$ | 100 | 4.1 | — | 22.5 | 0.2 |
| Acetone | — | 25.4 | — | 26.9 | 24.8 |
| $H_2O_2$ | — | 0.5 | — | — | 0.6 |
| Methane | — | 1.7 | 100 | 9 | 0.3 |
| $H_2O$ | — | 9.5 | — | 5.6 | 10.4 |

Practice of the invention is especially advantageous in that increased yields of hydrogen peroxide are achieved while operation is conducted safely and efficiently. Yields of hydrogen peroxide are readily obtainable which are 5% or more higher than those achieved by conventional procedures.

I claim:

1. In a process for the liquid phase molecular oxygen oxidation of a secondary alcohol to hydrogen peroxide wherein the exothermic heat of reaction is removed by vaporizing a portion of the reaction mixture and condensing the resulting vapors, the improvement which comprises adding a ballast gas selected from methane, ethane, and propane to the said vapors prior to condensation.

2. The process of claim 1 wherein the ballast gas is methane and the secondary alcohol is isopropanol.

3. In a process for the liquid phase molecular oxygen oxidation of a secondary alcohol to hydrogen peroxide in an oxidation zone, the improvement which comprises removing a stream of reaction liquid from the oxidation zone, injecting molecular oxygen into the removed reaction liquid, and circulating the resulting combined mixture of reaction liquid and oxygen back to the oxidation zone.

4. The process of claim 3 wherein the secondary alcohol is isopropanol.

5. A process for the liquid phase molecular oxygen oxidation of a secondary alcohol to hydrogen peroxide wherein feed secondary alcohol and a recycled stream containing molecular oxygen are reacted in a first oxidation zone with a secondary alcohol conversion of 1–10%, liquid reaction mixture is passed from said first zone to a second reaction zone wherein the liquid reaction mixture is further reacted to form hydrogen peroxide, the total oxygen for the reaction being fed to said second zone, the hydrogen peroxide product being recovered from the second reaction zone reaction mixture.

* * * * *